April 4, 1961 D. B. DEAVER 2,978,064
GAS PURIFIER
Filed Feb. 19, 1959
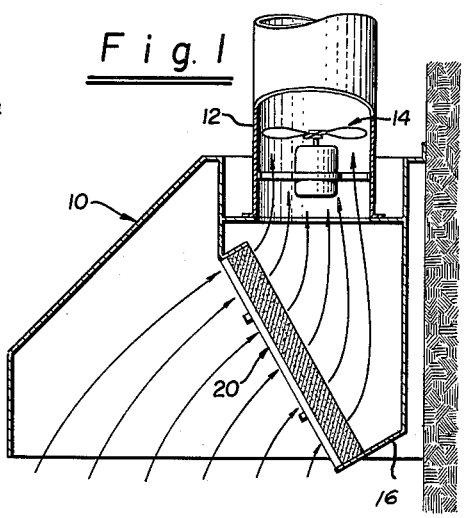
Fig. 1
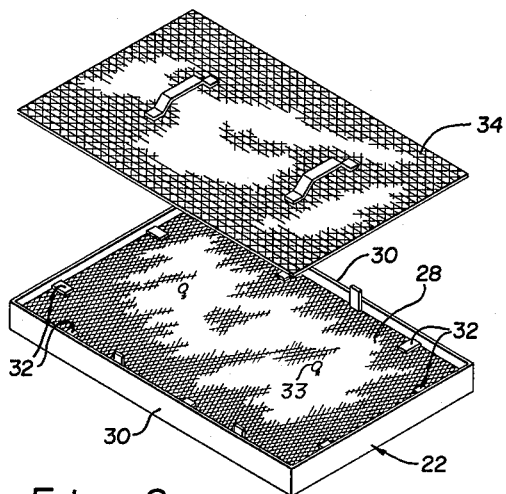
Fig. 2
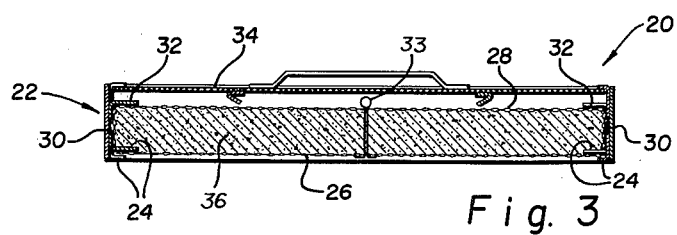
Fig. 3
Fig. 4
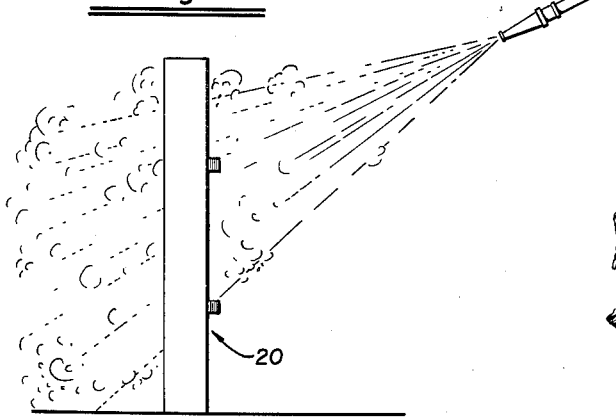
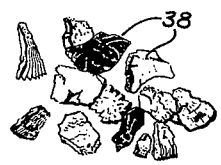
Fig. 5
INVENTOR.
Danny B. Deaver
BY
Attorneys

United States Patent Office 2,978,064
Patented Apr. 4, 1961

2,978,064

GAS PURIFIER

Danny B. Deaver, Oakland, Calif., assignor to Do-More Products Corp., Oakland, Calif., a corporation of California Filed Feb. 19, 1959, Ser. No. 794,462

3 Claims. (Cl. 183—4)

This invention relates to gas filtration and purification, and more particularly to an air purifier for use in restaurants where it is desirable to evacuate hot gases laden with grease and other organic matter from cooking operations. This application is a continuation-in-part of my previously filed application Serial No. 717,072, filed February 24, 1958, and now abandoned.

Recent developments and expansion in the use of deep frying equipment, griddles, roasters, broilers, etc., have created a real problem for the restaurateur due to the increased amounts of grease and other organic materials that are vaporized and drawn up the stack or flue by natural or induced draft from the hood over the range. Such organic matter solidifies on any cold surface within the kitchen area and particularly on the inside surface of the flue stack. When blowers are employed, the organic matter and grease tend to solidify on the fan blades and to clog them so that the grease laden air is no longer effectively evacuated from the kitchen area. The presence of the solidified grease or organic matter on the walls of the stack and other cold surfaces also presents an objectionable unsanitary condition, and turns the entire kitchen into a potential firetrap. What with flareups such as commonly occur during frying and broiling operations, the danger of fire is constantly present. Moreover, attempts to clean the area to remove the solidified matter are generally ineffective, as the material is carried by the exhaust gases into the inaccessible areas of the hood, blower, etc.

In general, it is an object of the present invention to provide an effective air purifier and filter for use in range hoods and the like, for removing grease and other organic material from cooking gases.

It is another object of the invention to provide an air purifier of such character that is also virtually fireproof, and which absorbs removed material in such manner as to prevent the grease from dripping onto the range or into the food cooking thereon.

It is a further object of the invention to provide an air purifier and filter for grease and other organic matter that can be easily and quickly cleaned by the action of a stream of hot water.

It is another object of the invention to provide such a construction that can be easily manufactured, at relatively low cost, and which is readily replaceable.

Other objects and advantages of the invention will be apparent from the following description and from the drawings in which:

Figure 1 is a vertical sectional view of the hood of a cooking range embodying my improved air filter and purifier;

Figure 2 is a view in perspective of the filter and purifier device, with the outer screen or grate removed;

Figure 3 is a view in transverse section along the line 3—3 of Figure 2, with the outer screen in place;

Figure 4 is a diagrammatic representation of the manner in which the filter device can be cleaned by a stream of hot water; and Figure 5 is a view on a greatly enlarged scale of the filter media employed.

In the drawings, the invention has been shown as particularly applied to the removal of grease or other organic material from cooking gases. It is to be understood, however, that it can be employed in many other applications and, in fact, wherever it is desired to remove grease and similar organic material from gases. Moreover, it is contemplated that apparatus similar to that disclosed can be used in the recovery of organic materials from various industrial gases or liquids, as will appear.

Generally stated, a device in accordance with the invention comprises a substantially flat, rigid outer frame defining a fluid passage, such frame preferably being rectangular and of relatively slight depth. This outer frame is provided with a pair of spaced substantially parallel flexible webs between which is confined a loosely packed filter body comprising granules of an expanded perlitic or micaceous material, specifically perlite or vermiculite. The particles of the filter body, which preferably have a size no less than about ⅜ inch, substantially fill the space between the flexible webs so as to extend transversely of an air passage through the frame. Desirably an additional web or grate is carried by the frame at a spaced distance from the filter body so as to create a zone of turbulence at the inlet side of the filter body. This zone acts to momentarily reduce the flow rate of the gases, and thereby insure maximum contact of the organic matter and grease with the loosely packed particles of perlite or vermiculite comprising the filter.

Referring to the drawings in detail, 10 represents the hood of a cooking range upon which is supported a stack or flue 12. In modern installation, the stack is normally provided with a suction blower 14 adapted to evacuate air through the stack at a rate of about 120 to 300 cubic feet per minute, generally about 200 cubic feet per minute. Positioned below the inlet of the stack is an enclosure or adapter frame 16 for removably mounting a filter unit 20. It will be understood that during a cooking operation the blower causes cooking gases to be evacuated through the filtering unit and upwardly through the stack to the atmosphere.

In accordance with the present invention, the filter unit comprises a continuous substantially rigid outer frame 22 which preferably is of rectangular configuration. As best illustrated in Figures 2 and 3, the outer frame 22 is of relatively slight depth and is provided with a pair of corresponding flanges 24 along one of its edges to receive an inner supporting web or screen 26. A second web or screen 28 is positioned outwardly of the inner web and at a spaced distance corresponding to the width of the side portions 30 of the web. The web 28 can be held in position by suitable retaining means such as the flexible edge strips of metal 32 attached to the inner sides of the frame and the centrally positioned ties 33. In a preferred embodiment, the webs 26 and 28 are constructed of a flexible shape-retaining material such as expanded metal, although screening or other similar materials can be suitably employed.

It is a feature of the invention that the space between the web is substantially filled with a loosely packed filter body 36 constituting expanded granules of a hydrated siliceous material such as perlite or vermiculite. As is well known these materials will expand when subjected to carefully controlled heat, due to the presence of the water of crystallization, frequently up to 10 to 20 times an original dimension.

Commercially available perlites, sometimes also referred to as "volcanic glasses," are particularly suited to the purposes of the invention. These perlites are essentially hydrated silicates of indefinite composition, with the types proving most satisfactory having the major portion of their silica content combined as sodium aluminum silicate. The chemical composition of a typical perlite is as follows:

| Ingredient: | Percent |
| --- | --- |
| Silica | 71.88 |
| Alumina | 12.73 |
| Combined alkalies | 7.28 |
| Water (or ignition loss) | 3.84 |
| Other | 4.27 |

When perlitic rocks of this type are carefully expanded, by conventional processes, they assume a highly porous, cellular characteristic that is unusually effective in the purification of cooking gases in accordance with the present invention.

The micaceous minerals know as vermiculite are likewise composed essentially of a hydrated silicate of indefinite composition (e.g. $MgO(FeAl)_2O_3,SiO_2$). The particles of vermiculite usually comprise a large number of superposed thin flat laminae which when heated to appropriate temperatures expand greatly—commercial materials being expanded as much as 16 times in one direction. Preferably the vermiculite used in the present invention is heated only sufficiently to produce a silver to golden color range, and leaves laminae that are soft and inelastic.

The particle size of perlite or vermiculite employed as the filter media should range from a lower limit of about ⅜ of an inch up to a size which will obstruct without limiting air flow through a bed of the material. The bulk density of the material should be about 6 pounds or less per cubic foot after being exfoliated or expanded.

I have found that a loosely packed bed of perlite or vermiculite having the above characteristics has a remarkable affinity for grease as well as most other organic materials normally found in cooking gases. As illustrated in Figure 5, the individual particles 38 of the filter body offer a multiple of surfaces and openings to trap the droplets of vaporized grease, etc. Such organic matter is quickly absorbed into the interstices and passages of the perlitic material or between the soft laminae of the vermiculite in amounts frequently as high as 8 to 10 times the original weight of the filter material. This result is particularly advantageous in cooking filters in view of the fact that both perlite and vermiculite are virtually fireproof, and are capable of resisting temperatures up to 2500° without fusing. Moreover, the capacity of particles of either material to expand rapidly in the presence of heat permits the material to be readily cleaned by exposure to a stream of hot water, as will appear.

Referring again to Figures 1 and 3, it will be seen that the filter unit 20 of the invention is designed to be positioned transversely of the air flow through the hood. To insure a proper contact of the contaminated cooking gases with the loose particles of the filter, I have found it desirable to create a zone of increased air circulation or turbulence immediately adjacent the entry side of the filter 28. In the illustrated apparatus, this dead space or turbulent zone is created by means of an additional web or grate 34 positioned a predetermined distance outwardly of the web 28. This grate can be about 60 to 80% open (optimum 68%) and may take any suitable form for the purpose. Desirably the grate 34 is removable to permit inspection of the main filter body, as illustrated in Figure 2.

The filter unit 20 is preferably positioned to completely obstruct the path of cooking gases being evacuated from the hood 10. Under normal operating conditions, a filter incorporating the features of the invention will effectively remove about 90 to 95% of all organic material from the gases being vented, which compares favorably with the 70% efficiency normally found with conventional filter units. They also advantageously present a substantially drip-free surface due to a characteristically low rate of moisture absorption of both perlite and vermiculite. Of particular importance, the filtering and purifying operation is virtually without fire hazard because the specific materials employed, even though containing many times their weight of grease and other organic matter, will effectively resist combustion.

When it becomes desirable to clean the filter unit after continuous use, it is only necessary to remove the frame from the hood and subject the filter mass to a stream of hot water, as illustrated in Figure 4. For best results, the water temperature should be about 160 to 180° F., although good results are obtained at all temperatures above about 120° F. In addition to a general washing effect, the hot water apparently causes a rapid expansion of the pores or thin laminae of the filter particles, such expansion apparently acting to expel the particles of grease and organic material from the surface of the particles and into the wash water. Cleaning of the filter unit in this manner can easily be accomplished in a few minutes time and the filter unit returned to the hood for further service.

As a modification of the present invention, it is contemplated that the filter body 36 may comprise particles of expanded perlite and vermiculite intermixed with one another, or either of these materials intermixed with other expansible igneous type rocks, including the obsidians, volcanic ash (pumicite), clays and silica. However, the results achieved with the specific materials indicated (e.g. perlite and vermiculite) are sufficiently superior to indicate that their use is critical for the purposes of the invention.

As indicated, the specific embodiment of the invention illustrated is particularly for use in association with cooking operations. However, the ability of the particles of vermiculite or perlite to remove organic material from fluid streams can prove useful in many industrial applications. For example, in glycerine recovery procedures, glycerine can be absorbed upon the surfaces of the filter body from gases and recovered by a water wash of the type illustrated in Figure 4. Thereafter the glycerine can be easily recovered from the aqueous solution. It is also contemplated that the filter unit of the invention will have application in removing carbonaceous materials from lubricating oils and other industrial liquids. Many other modifications and widely differing applications of the invention will suggest themselves to those skilled in this art. The disclosures and descriptions herein are purely illustrative and are not intended to be in any sense limiting.

I claim:

1. In a nonflammable, washable device for filtering and purifying relatively high temperature gases by the removal of organic matter, a continuous substantially rigid outer frame of relatively slight depth, spaced substantially parallel flexible webs carried within said frame, and a loosely packed filter body including granules of an expanded hydrated siliceous material selected from the group consisting of perlite and vermiculite, said filter body being confined between and substantially filling the spaces between said webs, said granules being of a size such that at least one dimension is no less than ⅜".

2. In a washable, easily cleaned air filter and purifier of a type particularly adapted to removing vaporized grease and other organic matter from hot cooking gases, a substantially flat rigid outer frame defining a fluid passage, said frame being rectangular and of relatively slight depth, a pair of spaced substantially parallel flexible webs supported by said outer frame and extending transversely of said air passage, a loosely packed filter body comprising granules of expanded hydrated silicate selected from the group consisting of perlite and vermiculite, said filter body being confined between said spaced webs and substantially filling the space therebetween, and an additional web carried by said frame at a spaced distance from said filter body, said additional web extending transversely of the air passage and on the inlet side of said frame whereby gases entering said air filter and purifier are caused to circulate in a zone of turbulence between said additional web and said filter body to ensure maximum contact with the granules of the filter body.

3. In a noninflammable, washable device for filtering and purifying relatively high temperature, grease-containing gases by the removal of organic matter, a continuous rigid outer frame of relatively slight depth, spaced substantially parallel flexible webs carried within said frame, and a loosely packed filter body including granules of an expanded hydrated siliceous material selected from the group consisting of perlite and vermiculite having laminae that are soft and inelastic obtained by heating only sufficiently to produce a silver to golden color range, said filter body being confined between and substantially filling the spaces between said webs, said granules being of a seize such that at least one dimension is no less than ⅜".

References Cited in the file of this patent

UNITED STATES PATENTS

| | | |
|---|---|---|
| 1,743,675 | Jordahl | Jan. 14, 1930 |
| 1,783,194 | McConnell et al. | Dec. 2, 1930 |
| 2,621,755 | Gray | Dec. 16, 1952 |
| 2,633,929 | Farr | Apr. 7, 1953 |
| 2,641,331 | Hudson | June 9, 1953 |
| 2,786,471 | Graybeal | Mar. 26, 1957 |
| 2,886,124 | Scharmer | May 12, 1959 |